(12) United States Patent
Yepez

(10) Patent No.: US 12,379,707 B2
(45) Date of Patent: Aug. 5, 2025

(54) MONITORING EQUIPMENT HEALTH

(71) Applicant: Schlumberger Technology Corporation, Sugar Land, TX (US)

(72) Inventor: Juan-Carlos Yepez, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 259 days.

(21) Appl. No.: 17/078,429

(22) Filed: Oct. 23, 2020

(65) Prior Publication Data

US 2022/0128967 A1 Apr. 28, 2022

(51) Int. Cl.
| | |
|---|---|
| *G05B 19/4065* | (2006.01) |
| *G06F 3/14* | (2006.01) |
| *G06Q 10/20* | (2023.01) |
| *G06Q 50/08* | (2012.01) |

(52) U.S. Cl.
CPC .......... *G05B 19/4065* (2013.01); *G06F 3/14* (2013.01); *G06Q 10/20* (2013.01); *G06Q 50/08* (2013.01); *G05B 2219/45129* (2013.01)

(58) Field of Classification Search
CPC ........ E21B 41/00; E21B 3/022; E21B 19/008; E21B 45/00; E21B 47/04; E21B 21/08; E21B 44/00; G01B 21/18; G05B 19/4065; G05B 2219/45129; G05B 23/0235; G05B 23/0272; G06F 3/14; G06Q 10/20; G06Q 50/08

See application file for complete search history.

(56) References Cited

U.S. PATENT DOCUMENTS

| | | |
|---|---|---|
| 5,745,049 A | 4/1998 | Akiyama et al. |
| 6,941,244 B1 | 9/2005 | Saito et al. |
| 7,099,649 B2 | 8/2006 | Patterson et al. |
| (Continued) | | |

FOREIGN PATENT DOCUMENTS

| | | |
|---|---|---|
| WO | 2016026680 A1 | 2/2016 |
| WO | 2020018492 A1 | 1/2020 |
| WO | 2020086680 A1 | 4/2020 |

OTHER PUBLICATIONS

Merrian-Webster, definition of "Alarm", retrieved from the internet URL:<https://www.merriam-webster.com/dictionary/alarm> (Year: 2025).*

*Primary Examiner* — Kamini S Shah
*Assistant Examiner* — Jonathan Michael Skrzycki
(74) *Attorney, Agent, or Firm* — Jeffrey D. Frantz

(57) ABSTRACT

Systems and methods for monitoring operational health of an equipment unit. An example system may include a plurality of sensors operable to facilitate operational measurements indicative of operational status of the equipment unit, a video output device, and a processing device comprising a processor and a memory storing an executable program code. The processing device may be communicatively connected with the sensors and the video output device. The processing device may be operable to receive the operational measurements and determine a plurality of operational health indicators based at least partially on the operational measurements. Each operational health indicator may be indicative of operational health of the equipment unit with respect to a different operational health category. The processing device may then output the operational health indicators for display on the video output device.

20 Claims, 6 Drawing Sheets

(56) References Cited

U.S. PATENT DOCUMENTS

| | | |
|---|---|---|
| 7,143,007 B2 | 11/2006 | Long et al. |
| 7,880,634 B2 | 2/2011 | Fuller et al. |
| 7,925,472 B2 | 4/2011 | Nasr et al. |
| 8,112,521 B2 | 2/2012 | Barnett et al. |
| 8,134,474 B2 | 3/2012 | Fuller et al. |
| 8,204,697 B2 | 6/2012 | Garvey et al. |
| 8,216,517 B2 | 7/2012 | Prasad et al. |
| 8,347,957 B2 | 1/2013 | Stephenson et al. |
| 8,423,397 B2 | 4/2013 | Sitton |
| 8,490,705 B2 | 7/2013 | Curtiss, III |
| 8,503,190 B2 | 8/2013 | Tart et al. |
| 8,554,717 B2 | 10/2013 | Reckmann et al. |
| 8,560,096 B1 | 10/2013 | Chapman et al. |
| 8,560,097 B1 | 10/2013 | Chapman et al. |
| 8,560,098 B1 | 10/2013 | Chapman et al. |
| 8,583,597 B2 | 11/2013 | Atamna et al. |
| 8,676,721 B2 | 3/2014 | Piovesan et al. |
| 8,761,910 B1 | 6/2014 | Chapman, Jr. et al. |
| 8,761,911 B1 | 6/2014 | Chapman et al. |
| 8,761,912 B1 | 6/2014 | Chapman, Jr. et al. |
| 8,781,743 B2 | 7/2014 | McKay et al. |
| 8,819,652 B2 | 8/2014 | Zingelewicz et al. |
| 8,825,567 B2 | 9/2014 | Jiang et al. |
| 8,898,525 B2 | 11/2014 | Loganathan et al. |
| 9,053,468 B2 | 6/2015 | Haynes et al. |
| 9,110,452 B2 | 8/2015 | Blevins et al. |
| 9,260,943 B2 | 2/2016 | Eriksson et al. |
| 9,322,247 B2 | 4/2016 | Rojas et al. |
| 9,546,545 B2 | 1/2017 | Cardellini et al. |
| 9,633,067 B2 | 4/2017 | Maddock |
| 9,658,130 B2 | 5/2017 | Veeningen |
| 9,933,919 B2 | 4/2018 | Raja et al. |
| 9,934,338 B2 | 4/2018 | Germain et al. |
| 9,934,479 B2 | 4/2018 | Sanchez et al. |
| 10,049,474 B2 | 8/2018 | Germain et al. |
| 10,161,226 B2 | 12/2018 | Bagnaro |
| 10,209,400 B2 | 2/2019 | Bermudez Martinez et al. |
| 10,215,009 B2 | 2/2019 | Tjostheim et al. |
| 10,221,674 B2 | 3/2019 | Samuel |
| 10,260,332 B2 | 4/2019 | Israel et al. |
| 10,273,752 B2 | 4/2019 | Mebane, III |
| 10,294,770 B2 | 5/2019 | Anghelescu et al. |
| 10,301,923 B2 | 5/2019 | Andresen et al. |
| 10,392,918 B2 | 8/2019 | Harkless et al. |
| 10,541,051 B1* | 1/2020 | Farrell .............. G01R 31/396 |
| 10,648,317 B2 | 5/2020 | Dykstra et al. |
| 10,685,335 B2 | 6/2020 | Buca et al. |
| 10,689,953 B2 | 6/2020 | Camacho Cardenas et al. |
| 10,769,323 B2 | 9/2020 | Camacho Cardenas |
| 10,782,677 B2 | 9/2020 | Zheng et al. |
| 10,782,679 B2 | 9/2020 | Zheng et al. |
| 10,851,645 B2 | 12/2020 | Mandava et al. |
| 11,296,955 B1* | 4/2022 | Fletcher .............. H04L 41/5032 |
| 2003/0005486 A1* | 1/2003 | Ridolfo .............. G05B 23/0272 800/288 |
| 2004/0088115 A1* | 5/2004 | Guggari .............. G06Q 10/06 702/183 |
| 2004/0155466 A1* | 8/2004 | Sodemann .............. H02P 9/04 290/1 A |
| 2008/0009977 A1* | 1/2008 | Krishnan .............. G05B 23/0289 700/266 |
| 2008/0215727 A1* | 9/2008 | Denis .............. H04L 43/0817 709/227 |
| 2009/0049396 A1* | 2/2009 | Fisher .............. G06F 3/0481 715/772 |
| 2014/0074260 A1 | 3/2014 | Schroeder et al. |
| 2014/0121973 A1 | 5/2014 | Buchanan et al. |
| 2014/0182381 A1 | 7/2014 | Comeaux et al. |
| 2014/0231075 A1 | 8/2014 | Springett et al. |
| 2015/0160101 A1* | 6/2015 | Gao .............. G01M 13/028 702/6 |
| 2015/0294048 A1 | 10/2015 | Jones |
| 2015/0356521 A1 | 12/2015 | Sridhar et al. |
| 2016/0168979 A1 | 6/2016 | Zhang et al. |
| 2016/0179751 A1 | 6/2016 | Korjani et al. |
| 2016/0217379 A1 | 7/2016 | Patri et al. |
| 2016/0237773 A1* | 8/2016 | Dalton .............. G05B 23/0283 |
| 2016/0274551 A1 | 9/2016 | Mishra et al. |
| 2016/0292652 A1 | 10/2016 | Bowden, Jr. et al. |
| 2016/0371957 A1 | 12/2016 | Ghaffari et al. |
| 2017/0268323 A1 | 9/2017 | Dykstra et al. |
| 2017/0292998 A1* | 10/2017 | Vidhi .............. G01R 31/3648 |
| 2018/0149010 A1 | 5/2018 | Zheng et al. |
| 2018/0240287 A1* | 8/2018 | Watson .............. G07C 5/008 |
| 2018/0363421 A1 | 12/2018 | Harshbarger et al. |
| 2019/0033845 A1 | 1/2019 | Cella et al. |
| 2019/0101910 A1* | 4/2019 | Schleiss .............. G05B 23/0272 |
| 2019/0120023 A1 | 4/2019 | Ocegueda-Hernandez et al. |
| 2019/0264545 A1 | 8/2019 | Camacho Cardenas et al. |
| 2019/0345788 A1 | 11/2019 | Park et al. |
| 2020/0003046 A1 | 1/2020 | Zheng et al. |
| 2020/0003611 A1 | 1/2020 | Turner et al. |
| 2020/0123878 A1 | 4/2020 | Yepez |
| 2020/0200930 A1 | 6/2020 | Parmeshwar et al. |
| 2020/0277847 A1 | 9/2020 | Rojas et al. |
| 2020/0291767 A1 | 9/2020 | Kroslid et al. |
| 2020/0300079 A1 | 9/2020 | Camacho Cardenas |
| 2020/0318461 A1 | 10/2020 | Camacho Cardenas et al. |
| 2020/0326226 A1 | 10/2020 | Camacho Cardenas |
| 2020/0326375 A1 | 10/2020 | Camacho Cardenas et al. |
| 2020/0327423 A1 | 10/2020 | Zheng et al. |
| 2020/0347714 A1 | 11/2020 | Kilic et al. |
| 2020/0370988 A1 | 11/2020 | Rogers et al. |
| 2020/0399988 A1 | 12/2020 | Camacho Cardenas et al. |
| 2020/0400007 A1 | 12/2020 | Wu et al. |
| 2020/0401744 A1 | 12/2020 | Camacho Cardenas |
| 2021/0062612 A1 | 3/2021 | Nguyen et al. |
| 2021/0062619 A1 | 3/2021 | Camacho Cardenas et al. |

\* cited by examiner

MONITORING EQUIPMENT HEALTH

BACKGROUND OF THE DISCLOSURE

Wells are generally drilled into the ground or ocean bed to recover natural deposits of oil, gas, and other materials that are trapped in subterranean formations. Well construction operations (e.g., drilling operations) may be performed at a wellsite by a well construction system (i.e., a drill rig) having various automated surface and subterranean well construction equipment operating in a coordinated manner. For example, a drive mechanism, such as a top drive or a rotary table located at a wellsite surface, may be utilized to rotate and advance a drill string into a subterranean formation to drill a wellbore. The drill string may include a plurality of drill pipes coupled together and terminating with a drill bit. The length of the drill string is increased by adding additional drill pipes as the depth of the wellbore increases. A drilling fluid (i.e., drilling mud) may be pumped by mud pumps from the wellsite surface down through the drill string to the drill bit. The drilling fluid lubricates and cools the drill bit, and carries drill cuttings from the wellbore back to the wellsite surface. The drilling fluid returning to the surface may then be cleaned and again pumped through the drill string.

The success of well construction operations may be related to many factors, including failure rates. Due to high pressures, high forces, and high frequency of use, certain pieces of well construction equipment can wear out and fail. Equipment wear and impending failures are often detected late, resulting in operational stoppages and severe damage to the equipment. Operational interruptions may reduce efficiency of the well construction operations and delay completion of the well. Such consequences make equipment health diagnosis, preemptive equipment maintenance, and timely detection of failures a high priority in the oil and gas industry.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a system for monitoring operational health of an equipment unit. The system includes sensors for operational measurements indicative of operational status of the equipment unit, a video output device, and a processing device having a processor and a memory storing an executable program code. The processing device is communicatively connected with the sensors and the video output device. The processing device receives the operational measurements and determines operational health indicators based at least partially on the operational measurements. Each operational health indicator is indicative of operational health of the equipment unit with respect to a different operational health category. The processing device also outputs the operational health indicators for display on the video output device.

The present disclosure also introduces an apparatus including a system for monitoring operational health of an equipment unit, the system including sensors for operational measurements indicative of operational status of the equipment unit, a video output device, and a processing device including a processor and a memory storing an executable program code. The processing device is communicatively connected with the sensors and the video output device. The processing device receives the operational measurements and determines operational health indicators based at least partially on the operational measurements. A first one of the operational health indicators is indicative of a fraction of an operational capacity of the equipment unit at which the equipment unit is operating. A second one of the operational health indicators is indicative of states of abnormal operation alarms associated with the equipment unit. A third one of the operational health indicators is indicative of completion status of maintenance work orders for the equipment unit. The processing device also outputs the operational health indicators for display on the video output device.

The present disclosure also introduces a method that includes commencing operation of a monitoring system for monitoring operational health of an equipment unit. Commencing operation of the monitoring system causes the monitoring system to receive operational measurements indicative of operational status of the equipment unit from sensors. Commencing operation of the monitoring system also causes the monitoring system to determine operational health indicators based at least partially on the operational measurements. Each operational health indicator is indicative of operational health of the equipment unit with respect to a different operational health category. Commencing operation of the monitoring system also causes the monitoring system to output the operational health indicators for display on a video output device.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
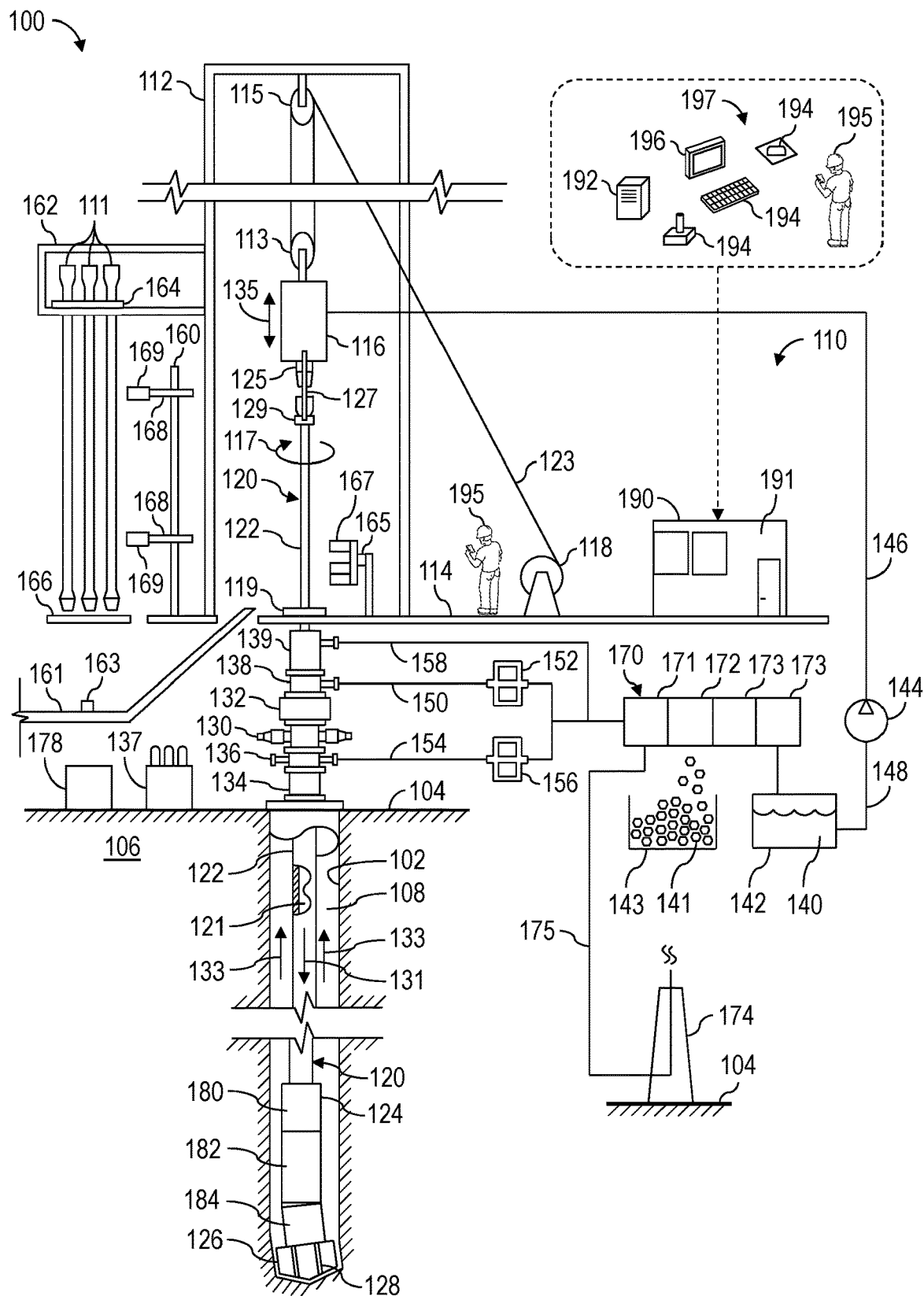
FIG. 1 is a schematic side view of at least a portion of an example implementation of apparatus according to one or more aspects of the present disclosure.

It is to be understood that the following disclosure describes many example implementations for different aspects introduced herein. Specific examples of components and arrangements are described below to simplify the present disclosure. These are merely examples, and are not intended to be limiting. In addition, the present disclosure may repeat reference numerals and/or letters in the various examples. This repetition is for simplicity and clarity, and does not in itself dictate a relationship between the various implementations described herein. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a drilling rig and associated wellsite equipment collectively operable to construct (e.g., drill) a wellbore 102 extending from a wellsite surface 104 into a subterranean formation 106 via rotary and/or directional drilling. During drilling operations, the various well construction equipment of the well construction system 100 may progress through a plurality of coordinated well construction operations (i.e., operational sequences) to drill or otherwise construct the wellbore 102. Although the well construction system 100 is depicted as an onshore implementation, the aspects described below are also applicable or readily adaptable to offshore implementations.

The well construction system 100 comprises various well construction equipment, including surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise a plurality of interconnected tubulars, such as drill pipe, heavy-weight drill pipe (HWDP), wired drill pipe (WDP), tough logging condition (TLC) pipe, and drill collars, among other examples. The conveyance means 122 may instead comprise coiled tubing for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor 184 connected with the drill bit 126. The BHA 124 may also include various downhole devices and/or tools 180, 182.

The support structure 112 may support a driver, such as a top drive 116, operable to connect (perhaps indirectly) with an upper end of the drill string 120, and to impart rotary motion 117 and vertical motion 135 to the drill string 120, including the drill bit 126. However, another driver, such as a kelly and rotary table (neither shown), may be utilized instead of or in addition to the top drive 116 to impart the rotary motion 117 to the drill string 120. The top drive 116 and the connected drill string 120 may be suspended from the support structure 112 via a hoisting system or equipment, which may include a traveling block 113, a crown block 115, and a drawworks 118 storing a support cable or line 123. The crown block 115 may be connected to or otherwise supported by the support structure 112, and the traveling block 113 may be coupled with the top drive 116. The drawworks 118 may be mounted on or otherwise supported by the rig floor 114. The crown block 115 and traveling block 113 comprise pulleys or sheaves around which the support line 123 is reeved to operatively connect the crown block 115, the traveling block 113, and the drawworks 118. The drawworks 118 may thus selectively impart tension to the support line 123 to lift and lower the top drive 116, resulting in the vertical motion 135. The drawworks 118 may comprise a drum, a base, and a prime mover (e.g., an electric motor) (not shown) operable to drive the drum to rotate and reel in the support line 123, causing the traveling block 113 and the top drive 116 to move upward. The drawworks 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (e.g., an electric motor) (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the drawworks 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The drill string 120 may be conveyed within the wellbore 102 through various fluid control devices disposed at the wellsite surface 104 on top of the wellbore 102 and perhaps below the rig floor 114. The fluid control devices may be operable to control fluid within the wellbore 102. The fluid control devices may include a blowout preventer (BOP) stack 130 for maintaining well pressure control comprising a series of pressure barriers (e.g., rams) between the wellbore 102 and an annular preventer 132. The fluid control devices may also include a rotating control device (RCD) 138 mounted above the annular preventer 132. The fluid control devices 130, 132, 138 may be mounted on top of a wellhead 134. A power unit 137 (i.e., a BOP control or closing unit) may be operatively connected with one or more of the fluid control devices 130, 132, 138 and operable to actuate, drive, operate, or otherwise control one or more of the fluid control devices 130, 132, 138. The power unit 137 may be or comprise a hydraulic fluid power unit fluidly connected with the fluid control devices 130, 132, 138 and selectively operable to hydraulically drive various portions (e.g., rams, valves, seals, etc.) of the fluid control devices 130, 132, 138. The power unit 137 may comprise one or more hydraulic pumps actuated by electric motors and operable to pressurize hydraulic fluid for operating the fluid control devices 130, 132, 138, as described herein.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid 140 (i.e., drilling mud), and one or more mud pump units 144 operable to move the drilling fluid 140 from the container 142 into the fluid passage 121 of the drill string 120 via a fluid conduit 146 extending from the pump units 144 to the top drive 116 and an internal passage extending through the top drive 116. Each pump unit 144 may comprise a fluid pump (not shown) operable to pump the drilling fluid 140 and a prime mover (e.g., an electric motor) (not shown) operable to drive the corresponding fluid pump. The fluid conduit 146 may comprise one or more of a pump discharge line, a stand pipe, a rotary hose, and a gooseneck connected with a fluid inlet of the top drive 116. The pumps 144 and the container 142 may be fluidly connected by a fluid conduit 148, such as a suction line.

During drilling operations, the drilling fluid may continue to flow downhole through the internal passage 121 of the drill string 120, as indicated by directional arrow 131. The drilling fluid may exit the BHA 124 via ports 128 in the drill bit 126 and then circulate uphole through an annular space 108 of the wellbore 102 defined between an exterior of the drill string 120 and the wall of the wellbore 102, such flow being indicated by directional arrows 133. In this manner, the drilling fluid lubricates the drill bit 126 and carries formation cuttings uphole to the wellsite surface 104. The returning drilling fluid may exit the annular space 108 via different fluid control devices during different stages or scenarios of well drilling operations. For example, the drilling fluid may exit the annular space 108 via a bell nipple 139, the RCD 138, or a ported adapter 136 (e.g., a spool, cross adapter, a wing valve, etc.) located above one or more rams of the BOP stack 130.

During normal drilling operations, the drilling fluid may exit the annular space 108 via the bell nipple 139 and then be directed toward drilling fluid reconditioning equipment 170 via a fluid conduit 158 (e.g., a gravity return line) to be cleaned and/or reconditioned, as described below, before being returned to the container 142 for recirculation. During managed pressure drilling operations, the drilling fluid may exit the annular space 108 via the RCD 138 and then be directed into a choke manifold 152 (e.g., a managed pressure drilling choke manifold) via a fluid conduit 150 (e.g., a drilling pressure control line). The choke manifold 152 may include at least one choke and a plurality of fluid valves (neither shown) collectively operable to control the flow through and out of the choke manifold 152. Backpressure may be applied to the annular space 108 by variably restricting flow of the drilling fluid or other fluids flowing through the choke manifold 152. The greater the restriction to flow through the choke manifold 152, the greater the backpressure applied to the annular space 108. The drilling fluid exiting the choke manifold 152 may then pass through the drilling fluid reconditioning equipment 170 before being returned to the container 142 for recirculation. During well pressure control operations, such as when one or more rams of the BOP stack 130 is closed, the drilling fluid may exit the annular space 108 via the ported adapter 136 and be directed into a choke manifold 156 (e.g., a rig choke manifold or a well control choke manifold) via a fluid conduit 154 (e.g., a rig choke line). The choke manifold 156 may include at least one choke and a plurality of fluid valves (neither shown) collectively operable to control the flow of the drilling fluid through the choke manifold 156. Backpressure may be applied to the annular space 108 by variably restricting flow of the drilling fluid (and other fluids) flowing through the choke manifold 156. The drilling fluid exiting the choke manifold 156 may then pass through the drilling fluid reconditioning equipment 170 before being returned to the container 142 for recirculation.

Before being returned to the container 142, the drilling fluid returning to the wellsite surface 104 may be cleaned and/or reconditioned via the drilling fluid reconditioning equipment 170, which may include one or more of liquid gas (i.e., mud gas) separators 171, shale shakers 172, and other drilling fluid cleaning and reconditioning equipment 173. The liquid gas separators 171 may remove formation gases entrained in the drilling fluid discharged from the wellbore 102 and the shale shakers 172 may separate and remove solid particles 141 (e.g., drill cuttings) from the drilling fluid. The drilling fluid reconditioning equipment 170 may further comprise other equipment 173 operable to remove additional gas and finer formation cuttings from the drilling fluid and/or modify chemical and/or physical properties or characteristics (e.g., rheology, density, etc.) of the drilling fluid. For example, the drilling fluid reconditioning equipment 170 may include a degasser, a desander, a desilter, a centrifuge, a mud cleaner, and/or a decanter, among other examples. The drilling fluid reconditioning equipment 170 may further include chemical containers and mixing equipment collectively operable to mix or otherwise add selected chemicals to the drilling fluid returning from the wellbore 102 to modify chemical and/or physical properties or characteristics of the drilling fluid being pumped back into the wellbore 102. Intermediate tanks/containers (not shown) may be utilized to hold the drilling fluid while the drilling fluid progresses through the various stages or portions 171, 172, 173 of the drilling fluid reconditioning equipment 170. The cleaned and reconditioned drilling fluid may be transferred to the fluid container 142, the solid particles 141 removed from the drilling fluid may be transferred to a solids container 143 (e.g., a reserve pit), and/or the removed gas may be transferred to a flare stack 174 via a conduit 175 (e.g., a flare line) to be burned or to a container (not shown) for storage and removal from the wellsite.

The surface equipment 110 may include a tubular handling system or equipment operable to store, move, connect, and disconnect tubulars (e.g., drill pipes) to assemble and disassemble the conveyance means 122 of the drill string 120 during drilling operations. For example, a catwalk 161 may be utilized to convey tubulars from a ground level, such as along the wellsite surface 104, to the rig floor 114, permitting the elevator 129 to grab and lift the tubulars above the wellbore 102 for connection with previously deployed tubulars. The catwalk 161 may have a horizontal portion and an inclined portion that extends between the horizontal portion and the rig floor 114. The catwalk 161 may comprise a skate 163 movable along a groove (not shown) extending longitudinally along the horizontal and inclined portions of the catwalk 161. The skate 163 may be operable to convey (e.g., push) the tubulars along the catwalk 161 to the rig floor 114. The skate 163 may be driven along the groove by a drive system (not shown), such as a pulley system or a hydraulic system. Additionally, one or more racks (not shown) may adjoin the horizontal portion of the catwalk 161. The racks may have a spinner unit for transferring tubulars to the groove of the catwalk 161. The tubular handling system may comprise a plurality of actuators collectively operable to move various portions of the tubular handling equipment to perform the methods and operations described herein. The actuators may be or comprise electric motors and/or hydraulic cylinders and rotary actuators. The hydraulic cylinders and rotary actuators may be powered by hydraulic power packs comprising hydraulic pumps actuated by electric motors to pressurize hydraulic fluid.

Power tongs 165 (e.g., an iron roughneck) may be positioned at the rig floor 114. The power tongs 165 may comprise a torqueing portion 167, such as may include a spinner and a torque wrench comprising a lower tong and an upper tong. The torqueing portion 167 of the power tongs 165 may be moveable toward and at least partially around the drill string 120, such as may permit the power tongs 165 to make up and break out connections of the drill string 120. The power tongs 165 may also be moveable away from the drill string 120, such as may permit the power tongs 165 to move clear of the drill string 120 during drilling operations. The spinner of the power tongs 165 may be utilized to apply low torque to make up and break out threaded connections between tubulars of the drill string 120, and the torque wrench may be utilized to apply a higher torque to tighten and loosen the threaded connections. The power tongs 165 may comprise a plurality of actuators collectively operable to actuate the torqueing portion 167. The actuators may be or comprise electric motors.

A set of slips 119 may be located on the rig floor 114, such as may accommodate therethrough the drill string 120 during tubular make up and break out operations and during the drilling operations. The slips 119 may be in an open position during drilling operations to permit advancement of the drill string 120, and in a closed position to clamp the upper end (i.e., the uppermost tubular) of the drill string 120 to thereby suspend and prevent advancement of the drill string 120 within the wellbore 102, such as during the make up and break out operations.

During drilling operations, the hoisting system lowers the drill string 120 while the top drive 116 rotates the drill string 120 to advance the drill string 120 downward within the wellbore 102 and into the formation 106. During the advancement of the drill string 120, the slips 119 are in an open position, and the power tongs 165 is moved away or is otherwise clear of the drill string 120. When the upper end of the drill string 120 (i.e., upper end of the uppermost tubular of the drill string 120) connected to the drive shaft 125 is near the slips 119 and/or the rig floor 114, the top drive 116 ceases rotating and the slips 119 close to clamp the upper end of the drill string 120. The grabber of the top drive 116 then clamps the uppermost tubular connected to the drive shaft 125, and the drive shaft 125 rotates in a direction reverse from the drilling rotation to break out the connection between the drive shaft 125 and the uppermost tubular. The grabber of the top drive 116 may then release the uppermost tubular.

Multiple tubulars may be loaded on the rack of the catwalk 161 and individual tubulars may be transferred from the rack to the groove in the catwalk 161, such as by the spinner unit. The tubular positioned in the groove may be conveyed along the groove by the skate 163 until the box end of the tubular projects above the rig floor 114. The elevator 129 of the top drive 116 then grasps the protruding box end, and the drawworks 118 may be operated to lift the top drive 116, the elevator 129, and the new tubular.

The hoisting system then raises the top drive 116, the elevator 129, and the new tubular until the tubular is aligned with the upper portion of the drill string 120 clamped by the slips 119. The power tongs 165 is moved toward the drill string 120, and the lower tong of the torqueing portion 167 clamps onto the upper end of the drill string 120. The spinning system threadedly connects the lower end (i.e., pin end) of the new tubular with the upper end (i.e., box end) of the drill string 120. The upper tong then clamps onto the new tubular and rotates with high torque to complete making up the connection with the drill string 120. In this manner, the new tubular becomes part of the drill string 120. The power tongs 165 then releases and moves clear of the drill string 120.

The grabber of the top drive 116 may then clamp onto the drill string 120. The drive shaft 125 is brought into contact with the upper end of the drill string 120 (i.e., the box end of the uppermost tubular) and rotated to make up a connection between the drill string 120 and the drive shaft 125. The grabber then releases the drill string 120, and the slips 119 are moved to the open position. The drilling operations may then resume.

The tubular handling equipment may further include a tubular handling manipulator (THM) 160 disposed in association with a vertical pipe rack 162 for storing tubulars 111 (e.g., drill pipes, drill collars, drill pipe stands, casing joints, etc.). The vertical pipe rack 162 may comprise or support a fingerboard 164 defining a plurality of slots configured to support or otherwise hold the tubulars 111 within or above a setback 166 (e.g., a platform or another area) located adjacent to, along, or below the rig floor 114. The fingerboard 164 may comprise a plurality of fingers (not shown), each associated with a corresponding slot and operable to close around and/or otherwise interpose individual tubulars 111 to maintain the tubulars 111 within corresponding slots of the fingerboard 164. The vertical pipe rack 162 may be connected with and supported by the support structure 112 or another portion of the wellsite system 100. The fingerboard 164/setback 166 provide storage (e.g., a temporary storage) of tubulars 111 during various operations, such as during and between tripping out and tripping of the drill string 120. The THM 160 may comprise a plurality of actuators collectively operable to move various portions of the THM 160 to perform the methods and operations described herein. The actuators may be or comprise electric motors.

The THM 160 may be operable to transfer the tubulars 111 between the fingerboard 164/setback 166 and the drill string 120 (i.e., space above the suspended drill string 120). For example, the THM 160 may include arms 168 terminating with clamps 169, such as may be operable to grasp and/or clamp onto one of the tubulars 111. The arms 168 of the THM 160 may extend and retract, and/or at least a portion of the THM 160 may be rotatable and/or movable toward and away from the drill string 120, such as may permit the THM 160 to transfer the tubular 111 between the fingerboard 164/setback 166 and the drill string 120.

To trip out the drill string 120, the top drive 116 is raised, the slips 119 are closed around the drill string 120, and the elevator 129 is closed around the drill string 120. The grabber of the top drive 116 clamps the upper end of a tubular of the drill string 120 coupled to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The power tongs 165 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The power tongs 165 then releases the drill string 120 and moves clear of the drill string 120.

The THM 160 may then move toward the drill string 120 to grasp the tubular suspended from the elevator 129. The elevator 129 then opens to release the tubular. The THM 160 then moves away from the drill string 120 while grasping the tubular with the clamps 169, places the tubular in the fingerboard 164/setback 166, and releases the tubular for storage. This process is repeated until the intended length of drill string 120 is removed from the wellbore 102.

The well construction system 100 may further comprise a power supply system 178 configured to supply electrical and mechanical (e.g., fluid) power for actuating or otherwise powering the surface equipment 110. The power supply system 178 may include one or more electric generators, electrical energy storage devices (e.g., batteries, capacitors, etc.), and fuel storage devices, among other examples. The power supply system 178 may also include various means (not shown) for transferring and/or distributing electrical power, mechanical power, and fuel to the well construction equipment and between various equipment of the power supply system 178, including electrical power conductors, electrical connectors, electrical relays, fluid conductors, fluid connectors, and fluid valves, among other examples.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA 124, among other examples, may be monitored and controlled. The control center 190 may be located on the rig floor 114 or another location of the well construction system 100. The control center 190 may comprise a facility 191 (e.g., a room, a cabin, a trailer, etc.) containing a control workstation 197, which may be operated by rig personnel 195 (e.g., a driller or another human rig operator) to monitor and control various well construction equipment or portions of the well construction system 100. The control workstation 197 may comprise or be communicatively connected with a central controller 192 (e.g., a processing device, a computer, etc.), such as may be operable to receive, process, and output information to monitor operations of and provide control to one or more portions of the well construction system 100. For example, the central controller 192 may be communicatively connected with the various surface equipment 110 and downhole equipment 120 described herein, and may be operable to receive signals from and transmit signals to such equipment to perform various operations described herein. The central controller 192 may store executable computer program code, instructions, and/or operational parameters or set-points, including for implementing one or more aspects of methods and operations described herein. The central controller 192 may be located within and/or outside of the facility 191. Although it is possible that the entirety of the central controller 192 is implemented within one device, it is also contemplated that one or more components or functions of the central controller 192 may be implemented across multiple devices, some or an entirety of which may be implemented as part of the control center 190 and/or located within the facility 191.

The control workstation 197 may be operable for entering or otherwise communicating control data (e.g., commands, signals, information, etc.) to the central controller 192 and other equipment controller by the rig personnel 195, and for displaying or otherwise communicating information from the central controller 192 to the rig personnel 195. The control workstation 197 may comprise one or more input devices 194 (e.g., a keyboard, a mouse, a joystick, a touchscreen, etc.) and one or more output devices 196 (e.g., a video monitor, a touchscreen, a printer, audio speakers, etc.). Communication between the central controller 192, the input and output devices 194, 196, and the various well construction equipment may be via wired and/or wireless communication means. However, for clarity and ease of understanding, such communication means are not depicted, and a person having ordinary skill in the art will appreciate that such communication means are within the scope of the present disclosure.

Other implementations of the well construction system 100 within the scope of the present disclosure may include more or fewer components than as described above and/or depicted in FIG. 1. Additionally, the various well construction equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
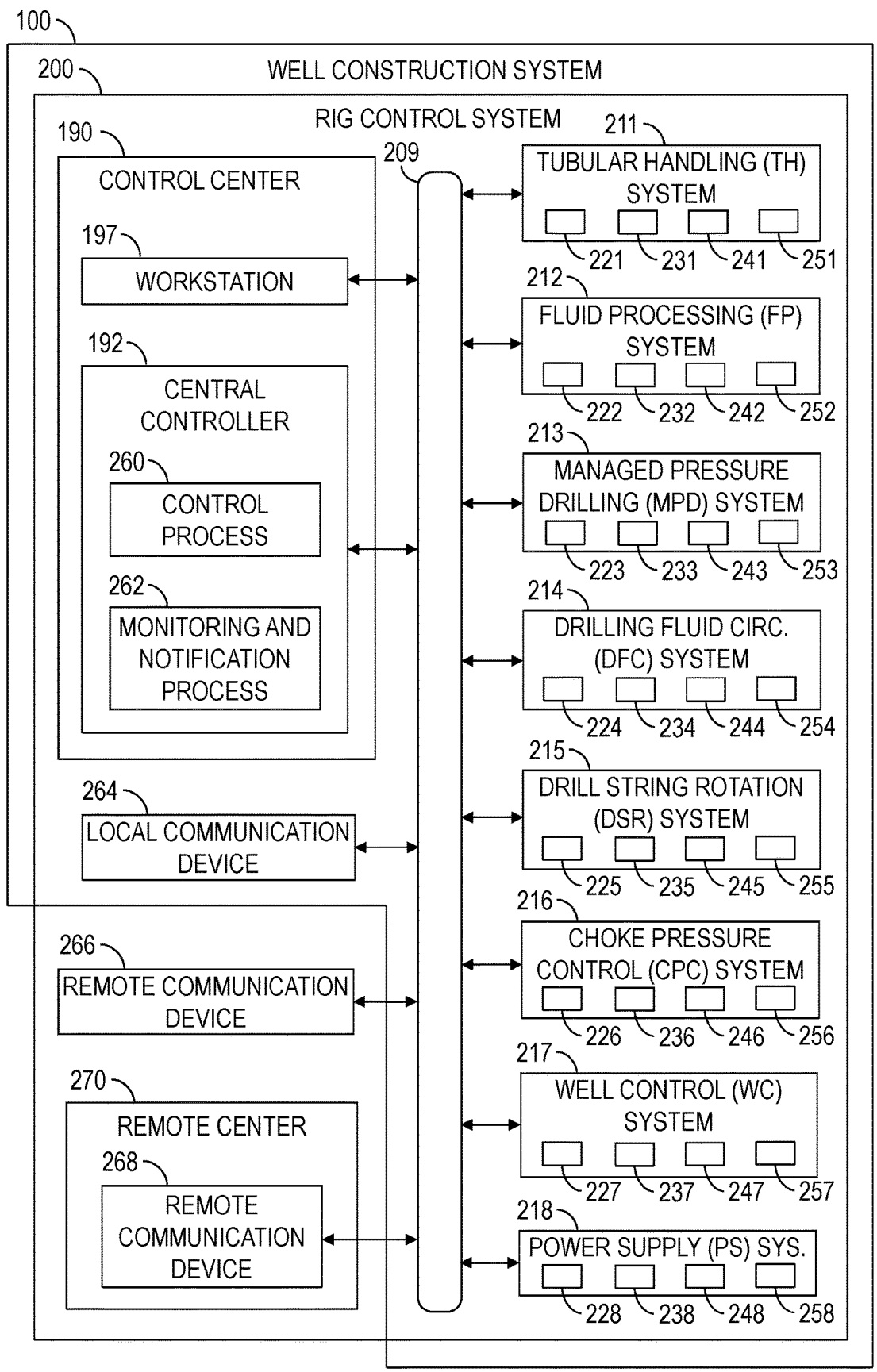
FIG. 2 is a schematic view of at least a portion of an example implementation of apparatus according to one or more aspects of the present disclosure.

The present disclosure is further directed to various implementations of systems and/or methods for monitoring and controlling one or more portions of the well construction system 100. FIG. 2 is a schematic view of at least a portion of an example implementation of a drilling rig monitoring and control system 200 (hereinafter a "rig control system") for monitoring and controlling various well construction equipment of the well construction system 100 shown in FIG. 1. The rig control system 200 may comprise one or more features of the well construction system 100, including where indicated by the same reference numerals. Accordingly, the following description refers to FIGS. 1 and 2, collectively.

The rig control system 200 may comprise a central controller 192 and a plurality of local controllers collectively in real-time communication with, and utilized to monitor and/or control, various portions, components, and equipment of the well construction system 100. The rig control system 200 may further comprise a control workstation 197, which may be operated by rig personnel 195 to monitor and control various well construction equipment or portions of the well construction system 100. The equipment of the well construction system 100 may be grouped into several subsystems, each operable to perform a corresponding operation and/or a portion of the well construction operations described herein. The subsystems may include a tubular handling (TH) system 211, a fluid processing (FP) system 212, a managed pressure drilling (MPD) system 213, a drilling fluid circulation (DFC) system 214, a drill string rotation system (DSR) system 215, a choke pressure control (CPC) system 216, a well pressure control (WC) system 217, and a power supply (PS) system 218.

The TH system 211 may include the support structure 112, a tubular hoisting system (e.g., the drawworks 118, the elevator links 127, the elevator 129, the slips 119), a tubular handling system or equipment (e.g., the catwalk 161, the THM 160, the setback 166, and/or the power tongs 165), and/or other tubular handling equipment. Accordingly, the TH system 211 may perform tubular handling and hoisting operations. The TH system 211 may also serve as a support platform for tubular rotation equipment and staging ground for rig operations, such as connection make up and break out operations described above. The FP system 212 may include the drilling fluid reconditioning equipment 170, the flare stack 174, the containers 142, 143, and/or other equipment. Accordingly, the FP system 212 may perform fluid cleaning, reconditioning, and mixing operations. The MPD system 213 may include the RCD 138, the power unit 137, the choke manifold 152, and/or other equipment. The DFC system 214 may comprise the pump units 144, the drilling fluid container 142, the bell nipple 139, and/or other equipment collectively operable to pump and circulate the drilling fluid at the wellsite surface and downhole. The DSR system 215 may include the top drive 116 and/or the rotary table and kelly. The CPC system 216 may comprise the choke manifold 156, the ported adapter 136, and/or other equipment, and the WC system 217 may comprise the BOP stack 130, the power unit 137, and a BOP control station for controlling the power unit 137. The PS system 218 may be or comprise the power supply system 178. The PS system 218 may comprise various sources of electrical power operable to actuator or otherwise power the well construction equipment of the well construction system 100, including the well construction equipment of the well construction subsystems 211-217. The PS system 218 may also include various means for transferring and/or distributing electrical power and fuel to the well construction equipment and between various pieces of equipment of the PS system 218, including electrical power conductors, electrical connectors, electrical relays, fluid conductors, fluid connectors, and fluid valves, among other examples. The sources of electrical power may include electric generators, electrical energy storage devices (e.g., batteries, capacitors, etc.), fuel storage devices, and a remote electrical power grid, among other examples. Each of the well construction subsystems 211-218 may further comprise various communication equipment (e.g., modems, network interface cards, etc.) and communication conductors (e.g., cables), communicatively connecting the equipment (e.g., sensors and/or actuators) of each subsystem 211-218 with the central controller 192 and the control workstation 197. Although the well construction equipment listed above and shown in FIG. 1 is associated with certain wellsite subsystems 211-218, such associations are merely examples that are not intended to limit or prevent such well construction equipment from being associated with two or more wellsite subsystems 211-218 and/or different wellsite subsystems 211-218.

The rig control system 200 may include various local controllers 221-228, each operable to control various well construction equipment of a corresponding subsystem 211-218 and/or an individual piece of well construction equipment of a corresponding subsystem 211-218. Each well construction subsystem 211-218 includes various well construction equipment comprising corresponding actuators 241-248 for performing operations of the well construction system 100. Each subsystem 211-218 may include various sensors 231-238 operable to output or otherwise facilitate sensor data (i.e., sensor signals and/or sensor measurements) indicative of operational status of the well construction equipment of each subsystem 211-218. Each local controller 221-228 may output control data (i.e., control commands and/or control signals) to one or more actuators 241-248 to cause the actuators 241-248 to perform corresponding actions of a piece of equipment or subsystem 211-218. Each local controller 221-228 may receive sensor data output by one or more sensors 231-238 indicative of operational status of an actuator or another portion of a piece of equipment of a corresponding subsystem 211-218.

The sensors 231-238 may include sensors utilized for operation of the various subsystems 211-218 of the well construction system 100. For example, the sensors 231-238 may include cameras, position sensors, speed sensors, acceleration sensors, pressure sensors, force sensors, temperature sensors, flow rate sensors, vibration sensors, electrical current sensors, electrical voltage sensors, resistance sensors, gesture detection sensors or devices, voice actuated or recognition devices or sensors, chemical sensors, exhaust sensors, and/or other examples. The sensor data may include signals, information, and/or measurements indicative of equipment operational status (e.g., on or off, percent load, up or down, set or released, etc.), drilling parameters (e.g., depth, hook load, torque, etc.), auxiliary parameters (e.g., vibration data of a pump), flow rate, temperature, operational speed, position, and pressure, among other examples. The acquired sensor data may include or be associated with a timestamp (e.g., date and/or time) indicative of when the sensor data was acquired. The sensor data may also or instead be aligned with a depth or other drilling parameter.

Each subsystem 211-218 may further include one or more corresponding local human-machine interfaces (HMIs) 251-258 usable by rig personnel (e.g., equipment maintenance personnel) to configure, monitor, and control corresponding well construction equipment of that subsystem 211-218. Each local HMI 251-258 may be installed in association with a corresponding piece of well construction equipment or subsystem 211-218 and communicatively connected with a corresponding local controller 221-228, sensors 231-238, and/or actuators 241-248. Each HMI 251-258 may be operable for entering or otherwise communicating control data to the corresponding local controller 221-228 by the rig personnel for controlling corresponding well construction equipment and/or subsystem 211-218. Although the local controllers 221-228, the sensors 231-238, the actuators 241-248, and the local HMIs 251-258 are each represented by a single block, it is to be understood that each subsystem 211-218 may comprise a plurality of local controllers 221-228, sensors 231-238, actuators 241-248, and locals HMIs 251-258.

The local controllers 221-228, the sensors 231-238, the actuators 241-248, and the local HMIs 251-258 may be communicatively connected with the central controller 192. For example, the sensors 231-238, the actuators 241-248, and the local HMIs 251-258 of the corresponding subsystems 211-218 may be communicatively connected with the local controllers 221-228 via local communication networks (e.g., field buses) (not shown) and the central controller 192 may be communicatively connected with the local controllers 221-228 via a central communication network 209 (e.g., a data bus, a field bus, a wide-area-network (WAN), a local-area-network (LAN), etc.). The sensor data output by the sensors 231-238 of the subsystems 211-218 may be received and processed by the local controllers 221-228 and/or the central controller 192. Similarly, control data output by the central controller 192 and/or the local controllers 221-228 may be communicated to the various actuators 241-248 of the subsystems 211-218, perhaps pursuant to predetermined programming, such as to facilitate well construction operations and/or other operations described herein. Although the central controller 192 is shown as a single device (i.e., a discrete hardware component), it is to be understood that the central controller 192 may be or comprise a plurality of equipment controllers and/or other electronic devices collectively operable to monitor and control operations (i.e., computational processes or methods) of the well construction system 100. The central controller 192 may be located within or form a portion of a control center 190, however a portion of the central controller 192 may instead be external to the control center 190.

The sensors 231-238 and actuators 241-248 may be monitored and/or controlled by corresponding local controllers 221-228 and/or the central controller 192. For example, the central controller 192 may be operable to receive sensor data from the sensors 231-238 of the subsystems 211-218 in real-time, and to output real-time control data directly to the actuators 241-248 of the subsystems 211-218 based on the received sensor data. However, certain operations of the actuators 241-248 of each subsystem 211-218 may be controlled by a corresponding local controller 221-228, which may control the actuators 241-248 based on sensor data received from the sensors 231-238 of the corresponding subsystem 211-218 and/or based on control data received from the central controller 192.

The rig control system 200 may be a tiered control system, wherein control of the subsystems 211-218 of the well construction system 100 may be provided via a first tier of the local controllers 221-228 and a second tier of the central controller 192. The central controller 192 may facilitate control of one or more of the subsystems 211-218 at the level of each individual subsystem 211-218. For example, in the FP system 212, sensor data may be fed into the local controller 242, which may respond to control the actuators 232. However, for control operations that involve multiple subsystems 211-218, the control may be coordinated through the central controller 192 operable to coordinate control of well construction equipment of two, three, four, or more (each) of the subsystems 211-218. For example, coordinated control operations may include the control of downhole pressure during tripping. The downhole pressure may be affected by the DFC system 214 (e.g., pump rate), the MPD system 213 (e.g., position of the choke 152), and the TH system 211 (e.g., tripping speed). Thus, when it is intended to maintain certain downhole pressure during tripping, the central controller 192 may output control data to two or more of the participating subsystems 211-218.

The central controller 192, the local controllers 221-228, and/or other controllers or processing devices (referred to hereinafter as "equipment controllers") of the rig control system 200 may each or collectively be operable to receive and store machine-readable and executable program code instructions (e.g., computer program code, algorithms, programmed processes or operations, etc.) on a memory device (e.g., a memory chip) and then execute the program code instructions to run, operate, or perform a control process for monitoring and/or controlling the well construction equipment of the well construction system 100.

The control workstation 197 may be utilized to monitor, configure, control, and/or otherwise operate one or more of the subsystems 211-218 by the rig personnel. The well construction system 100 may be monitored and/or controlled or operated at least partially manually by the rig personnel (e.g., a driller) via the control workstation 197. The control workstation 197 may be communicatively connected with the central controller 192 and/or the local controllers 221-228 via the communication network 209 and operable to receive sensor data from the sensors 231-238 and transmit control data to the central controller 192 and/or the local controllers 221-228 to control the actuators 241-248. Accordingly, the control workstation 197 may be utilized by the rig personnel to monitor, configure, and control the actuators 241-248 and other portions of the subsystems 211-218 via the central controller 192 and/or local controllers 221-228.

During manual or semi-automatic operation, the rig personnel may operate as a mechanization manager of the rig control system 200 by manually coordinating operations of various well construction equipment, such as to achieve an intended operational status (or drilling state) of the well construction operations, including tripping in or drilling at an intended rate of penetration (ROP). The control process of each local controller 221-228 may facilitate a lower (e.g., basic) level of control within the rig control system 200 to operate a corresponding piece of well construction equipment or a plurality of pieces of well construction equipment of a corresponding subsystem 211-218. Such control process may facilitate, for example, starting, stopping, and setting or maintaining an operating speed of a piece of well construction equipment. During manual operation of the well construction system 100, the rig personnel manually controls the individual pieces of well construction equipment to achieve the intended operational status of each piece of well construction equipment.

The central controller 192 may run (i.e., execute) a central control process 260 (i.e., a coordinated control process) and each local controller 221-228 may run a corresponding local control process (not shown). Two or more of the local controllers 221-228 may run their local control processes to collectively coordinate operations between well construction equipment of two or more of the subsystems 211-218. The central control process 260 of the central controller 192 may operate as a mechanization manager of the rig control system 200, coordinating operational sequences of the well construction equipment of the well construction system 100.

The control process 260 of the central controller 192 may output control data directly to the actuators 241-248 to control the well construction operations. The control process 260 may also or instead output control data to the control process of one or more local controllers 221-228, wherein each local control process of the local controllers 221-228 may then output control data to the actuators 241-248 of the corresponding subsystem 211-218 to control a portion of the well construction operations performed by that subsystem 211-218. Thus, the control processes of equipment controllers (e.g., central controller 192 and/or local controllers 221-228) of the rig control system 200 individually and collectively perform monitoring and control operations described herein, including monitoring and controlling well construction operations. The program code instructions forming the basis for the central control process 260 and the local control processes described herein may comprise rules (e.g., algorithms) based on the laws of physics for drilling and other well construction operations.

Each control process being run by an equipment controller of the rig control system 200 may receive and process (i.e., analyze) sensor data from the sensors 231-238 according to the program code instructions, and generate control data (i.e., control signals or information) to operate or otherwise control the actuators 241-248 of the well construction equipment. Equipment controllers within the scope of the present disclosure can include, for example, programmable logic controllers (PLCs), industrial computers (IPCs), personal computers (PCs), soft PLCs, variable frequency drives (VFDs) and/or other controllers or processing devices operable to store and execute program code instructions, receive sensor data, and output control data to cause operation of the well construction equipment based on the program code instructions, sensor data, and/or control data.

The central controller 192 may also or instead be operable to receive and store machine-readable and executable program code instructions on a memory device and then execute such program code instructions to run, operate, or perform a monitoring and notification process 262 operable to monitor operational parameters (i.e., operational status) of the various well construction equipment of the well construction system 100 to determine operational health (i.e., condition) of the well construction equipment and then notify personnel (e.g., maintenance personnel) of the determined operational health. For example, the monitoring and notification process 262 may be operable to receive and then analyze or otherwise process sensor data output by the sensors 231-238, determine the operational health of the well construction equipment based on the sensor data, and then output operational health information indicative of the operational health of the well construction equipment to a video output device for viewing by the personnel. One or more of the local controllers 221-228 may also execute program code instructions to execute a corresponding monitoring and notification process 262 to analyze or otherwise process sensor data output by sensors 231-238 associated with the well construction equipment of a corresponding subsystem 211-218 and determine the operational health of the well construction equipment based on the sensor data. The local controllers 221-228 may then transmit the operational health information to the central controller 192, which may then process the operational health information and/or output operational health information to the video output device for viewing by the personnel.

The monitoring and notification process 262 executed by the central controller 192 and/or the local controllers 221-228 may be operable to output (e.g., transmit, push, etc.) the operational health information to the control workstation 197 to be displayed to rig personnel (e.g., the driller) via the video output device 196. The monitoring and notification process 262 may also or instead be operable to output the operational health information to one or more communication devices 264, 266, 268 to be displayed to maintenance personnel. Each communication device 264, 266, 268 may comprise a video output device operable to display the operational health information to the maintenance personnel. For example, the monitoring and notification process 262 may be operable to output the operational health information to a local communication device 264 to be viewed by the rig maintenance personnel at the wellsite, who can then perform maintenance operations. The monitoring and notification process 262 may be operable to output the operational health information to remote communication devices 266, 268 to be displayed to remote maintenance personnel (e.g., technical support personnel, maintenance planners, maintenance supervisors, etc.) located off the wellsite, at a remote location from the wellsite. The communication devices 264, 266, 268 may be or comprise mobile or non-mobile communication devices, such as PCs (e.g., desktops, laptops, and/or tablet computers), personal digital assistants, smartphones, servers, internet appliances, and/or other types of computing devices. The communication devices 264, 266, 268 may be mobile communication devices carried by the maintenance personnel or stationary communication devices accessible by the maintenance personnel. One or more of the remote communication devices 266, 268, such as the remote communication device 268, may be located at a remote center 270 (e.g., a monitoring center, a technical support center, etc.).

The monitoring and notification process 262 may be further operable to determine operational health of the well construction equipment in terms of a plurality of operational health indicators, wherein each indicator defines, describes, or is otherwise indicative of operational health of the well construction equipment with respect to a different operational health category. The monitoring and notification process 262 may be operable determine and output the plurality of different operational health indicators to permit personnel (e.g., rig personnel, maintenance personnel, etc.) to evaluate operational health of the well construction equipment based on the different operational health categories. Each operational health indicator may be indicative of operational health of the well construction equipment associated with a corresponding operational health category. Each operational health category may be or comprise a different aspect, dimension, type, or criteria of operational health of the well construction equipment. Each operational health category may consider or be associated with different information indicative of operational health of the well construction equipment. Thus, each operational health indicator may be based on a different category of information (e.g., sensor data) indicative of operational health of the well construction equipment, and thus may be or comprise an independent indicator of operational health of the well construction equipment. Each operational health indicator may be displayed as a visual indicator on a video output device of one or more of the control workstation 197 and the communication devices 264, 266, 268. A visual indicator may be or comprise, for example, a number (e.g., a numerical health index, numerical ranking, numerical level, etc.) and/or a color indicative of operational health of the well construction equipment. Displaying operational health information in terms of different operational health indicators can permit maintenance personnel to ascertain a more complete understanding (i.e., assessment) of general and specific operational health status of the well construction equipment. Displaying operational health information in terms of different operational health indicators can permit the maintenance personnel to prioritize maintenance operations, such as by permitting planning or performance of maintenance operations to improve operational health of the well construction equipment with respect to operational health categories that are not operationally healthy.

Figure 3:
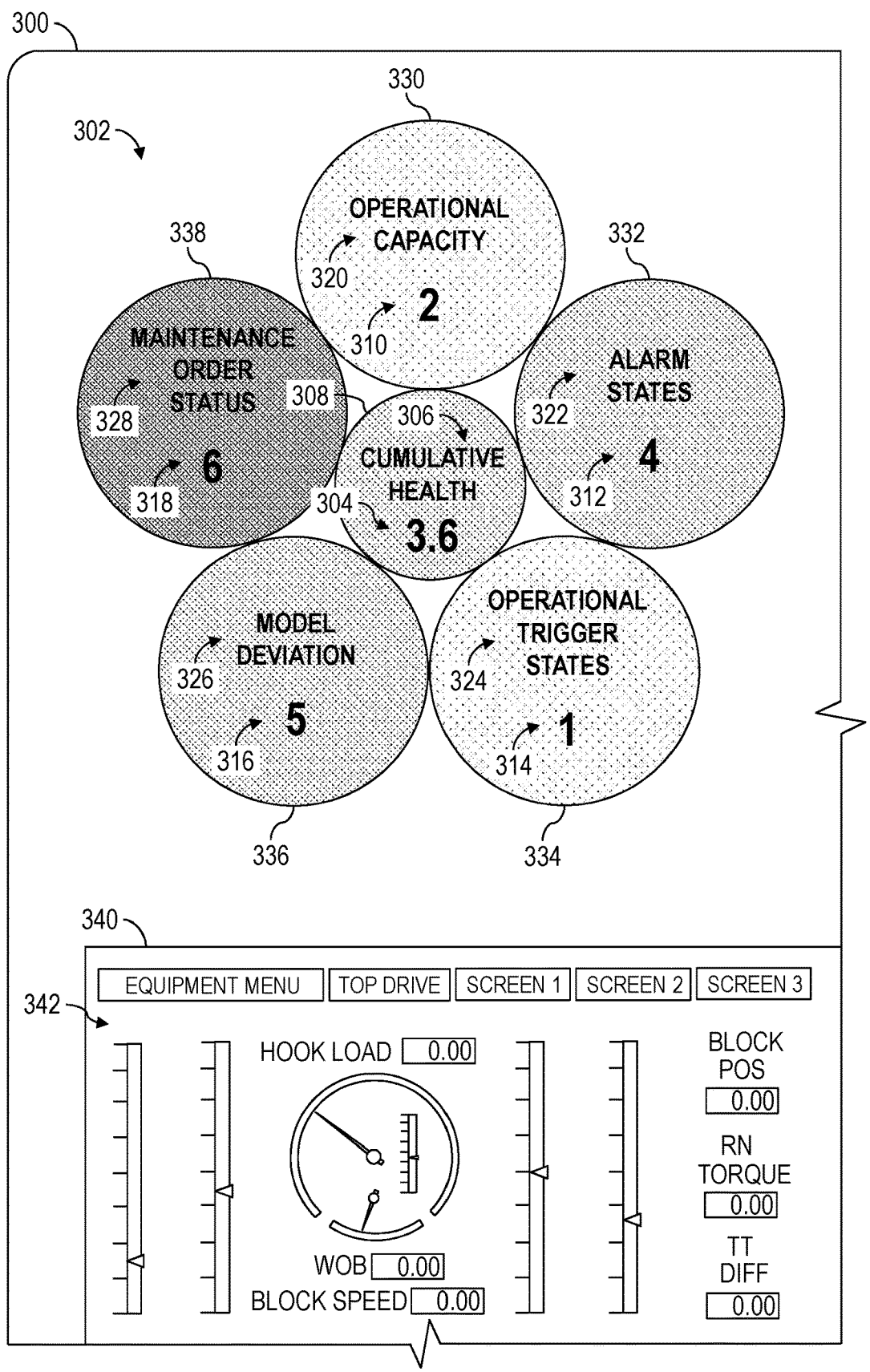
FIGS. 3-7 are example implementations of screens displayed by the apparatus shown in FIGS. 1 and 2 according to one or more aspects of the present disclosure.

FIG. 3 is a portion of an example diagnostic display screen 300 displaying example operational health information 302 indicative of operational health of a piece of well construction equipment (referred to hereinafter as an "equipment unit") shown in FIG. 1 or a plurality (e.g., a subsystem) of equipment units. The operational health information 302 comprises a plurality of different operational health indicators 310, 312, 314, 316, 318, each being indicative of operational health of the equipment unit with respect to a different operational health category. The display screen 300 may be displayed to personnel (e.g., rig personnel, maintenance personnel, etc.) on a video output device of the control workstation 197 and/or the communication devices 264, 266, 268 shown in FIG. 2. The operational health information 302 may be determined by the monitoring and notification process 262 or otherwise by the central controller 192 shown in FIG. 2 and then output for display on the video output device. Accordingly, the following description refers to FIGS. 1-3, collectively.

Each operational health indicator 310, 312, 314, 316, 318 may be or comprise a visual indicator, such as a number or a color indicative of operational health of the equipment unit with respect to a corresponding operational health category. A numerical operational health indicator may range, for example, between one and ten, with a low number being indicative of an operationally healthy equipment unit, and a high number being indicative of an operationally unhealthy equipment unit. A color based operational health indicator may include, for example, green, yellow, and red colors, with the green color being indicative of an operationally healthy equipment unit, the yellow color being indicative of a mildly operationally unhealthy equipment unit, and the red color being indicative of an operationally unhealthy equipment unit.

The operational health information 302 may further comprise a cumulative operational health indicator 304 indicative of overall operational health of the equipment unit. The cumulative operational health indicator 302 may be or comprise a sum or an average of the operational health indicators 310, 312, 314, 316, 318.

Each operational health indicator 304, 310, 312, 314, 316, 318 may be displayed in association with a category indicator 306, 320, 322, 324, 326, 328 describing or otherwise indicative of the operational health category to which the operational health indicator 304, 310, 312, 314, 316, 318 corresponds. Each operational health indicator 304, 310, 312, 314, 316, 318 and/or category indicator 306, 320, 322, 324, 326, 328 may be displayed as part of, within, or in association with a corresponding software icon (e.g., shape, figure, window, etc.) 308, 330, 332, 334, 336, 338.

An equipment unit may have a design factor for safely operating such equipment unit with respect to its operational capacity. The monitoring and notification process 262 may monitor operation of an equipment unit with respect to its operational capacity, which may include consideration of safety thresholds to determine if such operation is within safety limits.

The operational health indicator 310 may be indicative of a fraction of an operational capacity of an equipment unit at which that equipment unit is operating. For example, operating an equipment unit consistently at a level that is below the rated operational capacity (e.g., normal operation threshold) of the equipment unit may be considered safe, and thus indicated by an operational health indicator 310 having a value between, for example, one and three, and/or a green color. Operating an equipment unit at a level that results in occasional operational spikes above the rated operational capacity, but below maximum safe capacity (e.g., design factor) of the equipment unit may be considered mildly unsafe, and thus indicated by an operational health indicator 310 having a value between, for example, three and six, and/or a yellow color. Operating an equipment unit at a level that results in frequent or consistent operation above maximum safe capacity may be considered highly unsafe, and thus indicated by an operational health indicator 310 having a value of, for example, six or more, and/or a red color. Thus, if the operational health information 302 is associated with a generator unit having a maximum power rating of 1000 kilowatt (kW) is operated to output between one and 875 kW, the operational health indicator 310 may have a value between, for example, one and three, and/or a green color. When the generator unit is operated to output between 875 kW and 999 kW, the operational health indicator 310 may have a value between, for example, three and six, and/or a yellow color. When the generator unit is operated to output 1000 kW or more, the operational health indicator 310 may have a value between, for example, six and ten, and/or a red color.

An equipment unit may have a plurality of alarms that are set off when certain operational conditions (i.e., measurements) exceed predetermined thresholds of normal operation of the equipment unit, thereby indicating abnormal operation of the equipment unit. The monitoring and notification process 262 may monitor deviation from normal or otherwise intended operation of the equipment unit and trigger corresponding abnormal operation alarms. The monitoring and notification process 262 may trigger the alarms regardless of whether the equipment unit is still operational or not. The monitoring and notification process 262 may categorize the alarms.

The operational health indicator 312 may be indicative of states of the abnormal operation alarms associated with an equipment unit. For example, an abnormal operation alarm may be set for operating temperature of a motor for rotating a drum of the drawworks 118. A manufacturer recommended maximum operating temperature threshold for the motor may be 95 degrees Celsius (° C.). Abnormal operation alarms for the motor may be set to, for example, 80° C. and 95° C. Thus, when the motor is operated at 80° C. or less, the operational health indicator 312 may have a value between, for example, one and three, and/or a green color. When the motor is operated at a temperature between 80° C. and 95° C., a first alarm may be triggered and the operational health indicator 312 may have a value between, for example, three and six, and/or a yellow color. When the motor is operated at a temperature above 95° C., a second alarm may be triggered and the operational health indicator 312 may have a value between, for example, six and ten, and/or a red color.

An equipment unit may have a plurality of operational triggers that are triggered (i.e., implemented or executed) when certain operational conditions are reached or exceeded during the course of normal operation of the equipment unit. Each operational trigger may be indicative of a threshold of operational measurements within a normal operating range of the equipment unit. Each threshold of the operational measurements may be set or selected by personnel based on their experience with the equipment unit and/or based on historical operational measurements indicative of operational status of the equipment unit. Each threshold may be or comprise a pre-defined operational condition that personnel experienced while operating the equipment unit or an anomaly limit. Each operational trigger may be recorded by the central controller 192 or a database accessible by the monitoring and notification process 262.

The operational health indicator 314 may be indicative of states of operational triggers associated with an equipment unit. For example, an operational trigger may be set for operating temperature of a motor for rotating a drum of a drawworks 118. The temperature may be measured and recorded for a predetermined period of time (e.g., a week, a month, etc.) during which the temperature does not exceed 70 degrees ° C. An operational trigger may be set to, for example, 75° C., which when activated, may alert maintenance personnel to check operation of the motor even though such temperature is within the normal operating temperature range. Thus, when the motor is operated at less than 75° C., the operational health indicator 314 may have a value between, for example, one and three, and/or a green color. However, when the motor is operated at 75° C. or more, the operational trigger may be activated and the operational health indicator 314 may have a value between, for example, three and six, and/or a yellow color.

A mathematical (i.e., analytical) model of the equipment unit may be generated by a computer, and then the computer may run simulated operations of the mathematical model to calculate operational measurements that can be expected from the actual equipment unit during actual operations of the equipment unit. The mathematical model may thus be considered a digital twin of the equipment unit that can be used as a basis for evaluating various operational parameters of the equipment unit during operations.

The operational health indicator 316 may be indicative of amount of deviation of the operational measurements facilitated by the sensors 231-238 from expected operational measurements determined based on a mathematical model of an equipment unit. For example, a mathematical model of a pump unit 144 may be generated and its operations may be simulated by a computer (e.g., the central controller). The monitoring and notification process 262 may then compare the actual operational measurements to the simulated operational measurements. The actual and simulated operational measurements that can be compared may be indicative of, for example, drilling fluid flow, operating pressure, operating speed, motor temperature, electrical power consumption, and amplitude of vibrations. For example, when the actual and simulated operational measurements differ by less than 5%, then the operational health indicator 316 may have a value between, for example, one and three, and/or a green color. When the actual and simulated operational measurements differ by 5% to 10%, then the operational health indicator 316 may have a value between, for example, three and six, and/or a yellow color. When the actual and simulated operational measurements differ by more than 10%, then the operational health indicator 316 may have a value between, for example, six and ten, and/or a red color.

The monitoring and notification process 262 may communicatively connected to a maintenance order system and be operable to check the status of maintenance work orders associated with the equipment unit. Just because a maintenance work order is entered into the maintenance order system does not mean that the maintenance work order has been executed. The monitoring and notification process 262 may determine how many work orders are still outstanding, how long the work orders are outstanding, and how urgent the outstanding work orders are.

The operational health indicator 318 may be indicative of completion status of maintenance work orders for an equipment unit. For example, when more than 90% of maintenance work orders for an equipment unit are completed (i.e., closed), then the operational health indicator 318 may have a value between, for example, one and three, and/or a green color. When between 80% and 90% of maintenance work orders for an equipment unit are completed, then the operational health indicator 318 may have a value between, for example, three and six, and/or a yellow color. When less than 80% of maintenance work orders for an equipment unit are completed, then the operational health indicator 318 may have a value between, for example, six and ten, and/or a red color.

When the cumulative operational health indicator 304 has a value between one and three, and/or a green color, then such cumulative operational health indicator 304 may be indicative that an equipment unit is in an operationally healthy condition. When the cumulative operational health indicator 304 has a value between three and six, and/or a yellow color, then such cumulative operational health indicator 304 may be indicative that an equipment unit is in a mildly operationally unhealthy condition. When the cumulative operational health indicator 304 has a value between six and ten, and/or a red color, then such cumulative operational health indicator 304 may be indicative that an equipment unit is in an operationally unhealthy condition.

The display screen 300 may also display additional information 342 (e.g., operational measurements) indicative of operational status of predetermined equipment of the well construction system 100. For example, the display screen 300 may display information 342 based on which the operational health indicators 310, 312, 314, 316, 318 are determined. The information 342 may be displayed within a display window 340 (e.g., frame) located in association with the operational health information 302.

Each software icon 330, 332, 334, 336, 338 may operate as a digital link to information based on which the operational health indicators 310, 312, 314, 316, 318 are determined. Each software icon 330, 332, 334, 336, 338 may be pressed, clicked, selected, or otherwise operated via input devices 194 and/or via finger contact with a video output device (i.e., a touchscreen) by personnel to operate the digital link associated with that software icon 330, 332, 334, 336, 338. Operating a digital link of a software icon 330, 332, 334, 336, 338 may cause, for example, the display window 340 to display the detailed information 342. Operating a digital link of a software icon 330, 332, 334, 336, 338 may instead cause, for example, another display screen to be displayed on the video output device instead of the display screen 300. The detailed information 342 displayed in the display window 340 or on the new display screen may permit the personnel to further evaluate the operational health of an equipment unit based on such detailed information 342.

Figure 4:
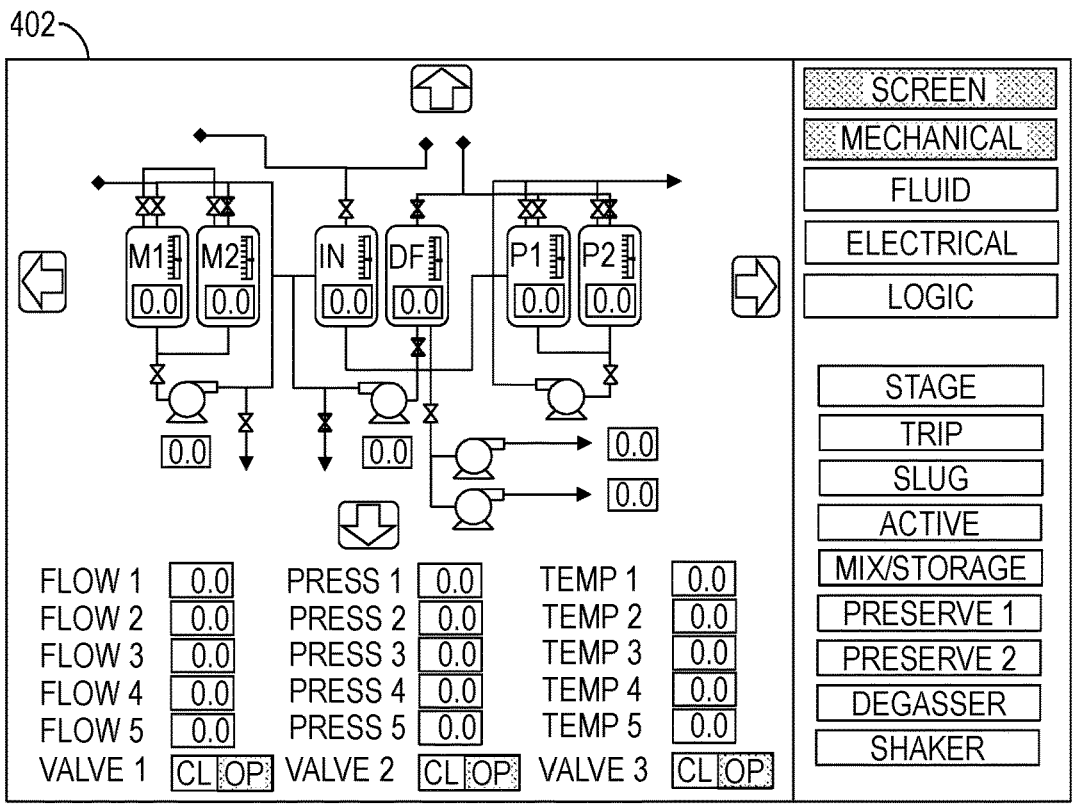

FIG. 4 is an example display screen 402 displaying various operational parameters of well construction equipment (e.g., mud pump units and mud tanks) associated with the operational health information 302. The display screen 402 displays operational measurements indicative of operational status and thus operational capacity of the equipment. The display screen 402 may be displayed in the display window 340 or on the new display screen when the digital link of the software icon 330 associated with the operational capacity indicator 310 is operated.

Figure 5:
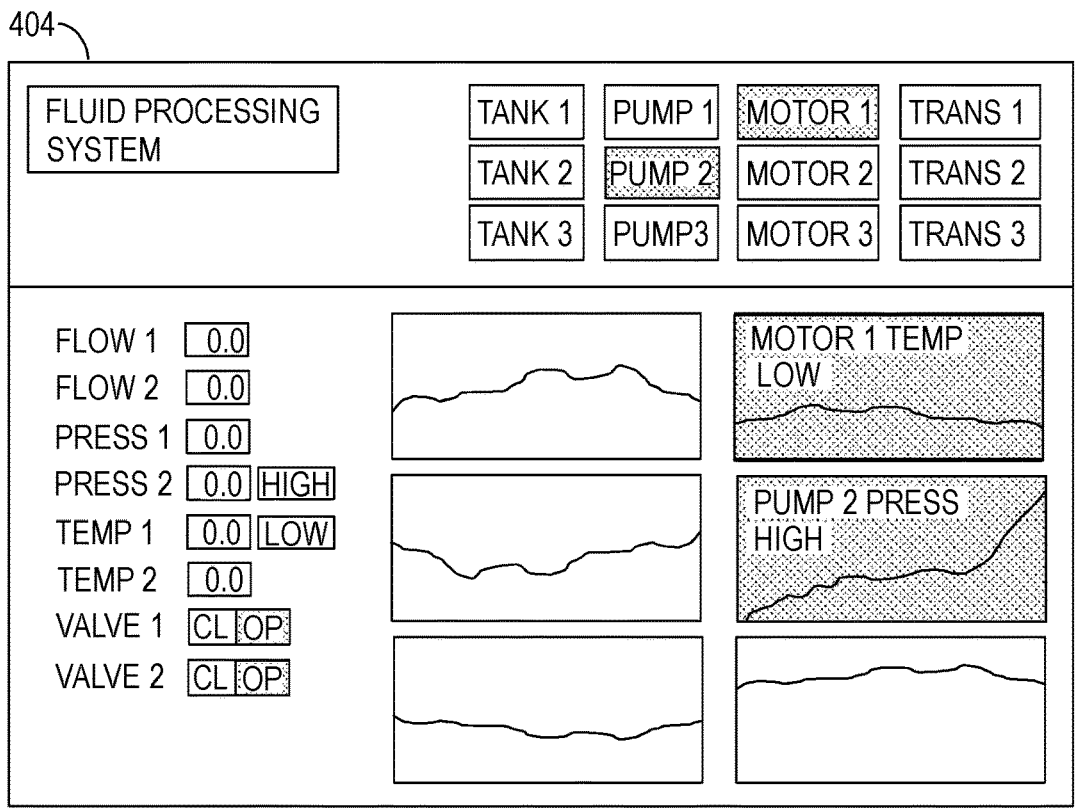

FIG. 5 is an example display screen 404 displaying various operational parameters of well construction equipment (e.g., mud pump units and mud tanks) associated with the operational health information 302. The display screen 404 displays and describes states of abnormal operation alarms and/or states of operational triggers associated with the well construction equipment. The display screen 404 may be displayed in the display window 340 or on the new display screen when the digital link of the software icon 332 associated with the abnormal operation alarm states indicator 312 is operated. The display screen 404 may also be displayed in the display window 340 or on the new display screen when the digital link of the software icon 334 associated with the operational trigger states indicator 314 is operated.

Figures 6, 7:
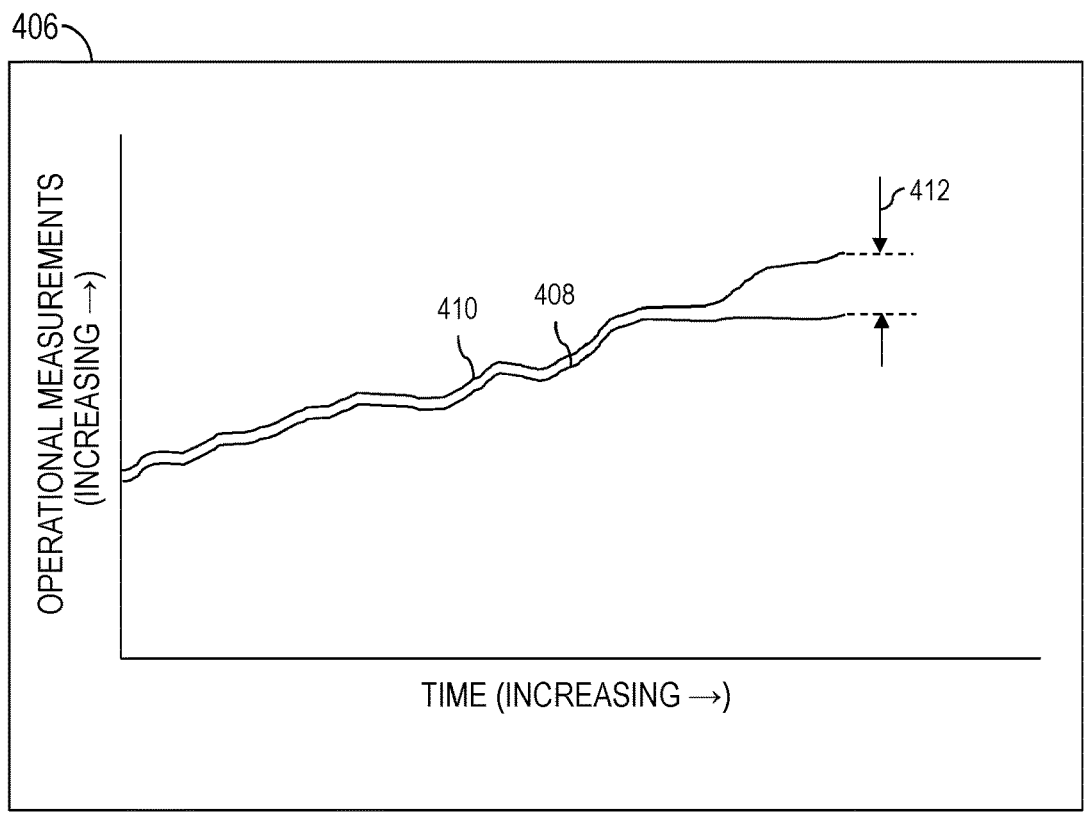

FIG. 6 is an example display screen 406 displaying simulated operational measurements 408 (e.g., temperature, flow, pressure, etc.) determined based on a mathematical model of an equipment unit and actual operational measurements 410 facilitated by sensors associated with the equipment unit. The monitoring and notification process 262 may monitor the difference 412 between the actual operational measurements 410 and the simulated operational measurements 408. The display screen 406 may be displayed in the display window 340 or on the new display screen when the digital link of the software icon 336 associated with the mathematical model deviation indicator 316 of the equipment unit is operated.

FIG. 7 is an example display screen 414 displaying an example maintenance work order submitted for an equipment unit. The work order may comprise information indicative of the location and time that the operational health problem was detected, a description or other information indicative of the operational health, a priority (or urgency) level assigned to the work order, mitigation information comprising a description of recommended tasks or actions to be performed by the maintenance personnel to mitigate the operational health, and execution status of the work order. The display screen 414 may be displayed in the display window 340 or on the new display screen when the digital link of the software icon 336 associated with the maintenance order status indicator 318 of the equipment unit is operated.

As described above and shown in FIGS. 1-7, systems (e.g., the monitoring system 200) and methods (e.g., the operational health monitoring operations) according to one or more aspects of the present disclosure may be utilized or otherwise implemented in association with a well construction system (e.g., the well construction system 100) at an oil and gas wellsite, such as for constructing a wellbore to obtain hydrocarbons (e.g., oil and/or gas) from a subterranean formation. However, the systems and methods of the present disclosure may be utilized or otherwise implemented in association with other automated systems in the oil and gas industry and other industries. For example, the systems and methods of the present disclosure may be implemented in association with wellsite systems for performing fracturing, cementing, acidizing, chemical injecting, and/or water jet cutting operations, among other examples. The systems and methods of the present disclosure may also be implemented in association with mining sites, building construction sites, and/or other work sites where automated machines or equipment are utilized.

Figure 8:
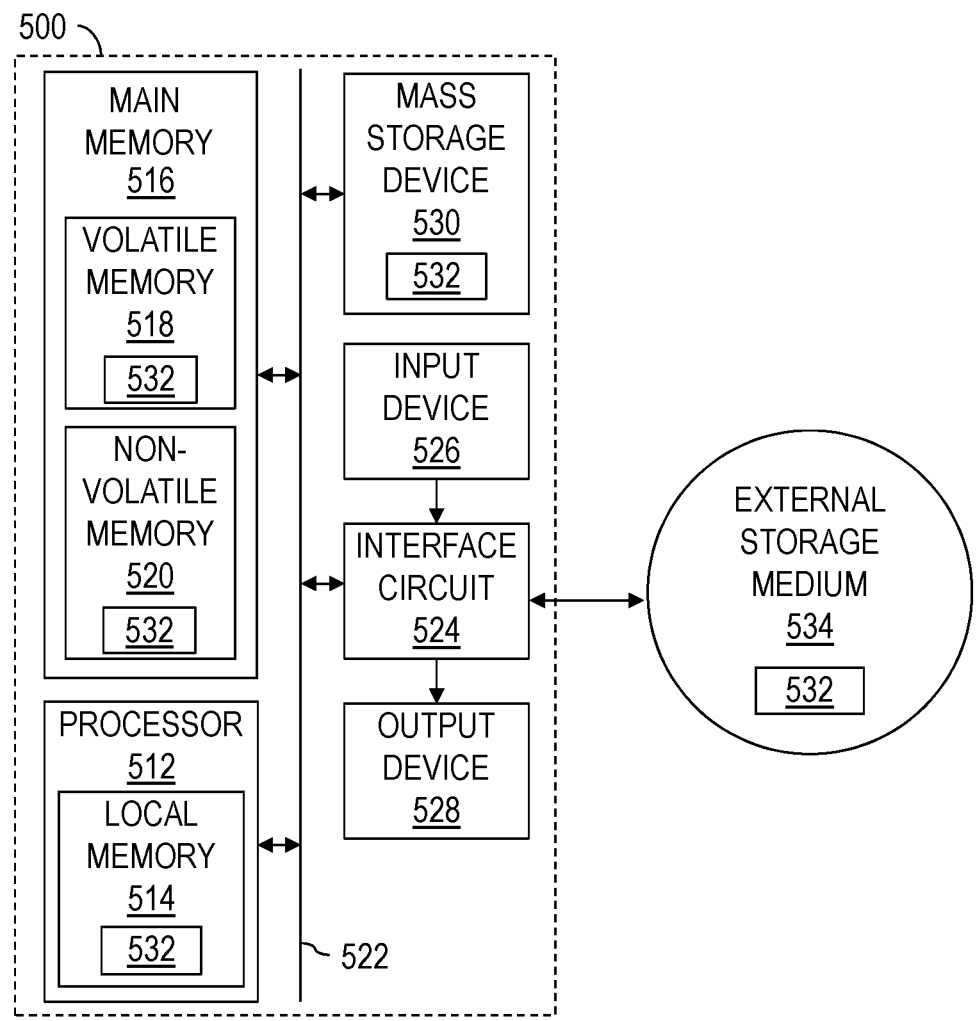
FIG. 8 is a schematic view of at least a portion of an example implementation of apparatus according to one or more aspects of the present disclosure.

FIG. 8 is a schematic view of at least a portion of an example implementation of a processing device (or system) 500 according to one or more aspects of the present disclosure. The processing device 500 may be or form at least a portion of one or more equipment controllers and/or other electronic devices shown in (or otherwise associated with) one or more of FIGS. 1-7. Accordingly, the following description refers to FIGS. 1-8, collectively.

The processing device 500 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing device 500 may be or form at least a portion of the rig control system 200, including the central controller 192, the local controllers 221-228, the communication devices 264, 266, 268, and the control workstation 197. Although it is possible that the entirety of the processing device 500 is implemented within one device, it is also contemplated that one or more components or functions of the processing device 500 may be implemented across multiple devices, some or an entirety of which may be at the wellsite and/or remote from the wellsite.

The processing device 500 may comprise a processor 512, such as a general-purpose programmable processor. The processor 512 may comprise a local memory 514, and may execute machine-readable and executable program code instructions 532 (i.e., computer program code) present in the local memory 514 and/or another memory device. The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 512 include one or more INTEL microprocessors, microcontrollers from the ARM and/or PICO families of microcontrollers, embedded soft/hard processors in one or more FPGAs.

The processor 512 may execute, among other things, the program code instructions 532 and/or other instructions and/or programs to implement the example methods and/or operations described herein. For example, the program code instructions 532, when executed by the processor 512 of the processing device 500, may cause the processor 512 to receive and process (e.g., compare) sensor data (e.g., sensor measurements). The program code instructions 532, when executed by the processor 512 of the processing device 500, may also or instead cause the processor 512 to output control data (i.e., control commands) to cause one or more portions or pieces of well construction equipment of a well construction system to perform the example methods and/or operations described herein.

The processor 512 may be in communication with a main memory 516, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by read-only memory, flash memory, and/or other types of memory devices. One or more memory controllers (not shown) may control access to the volatile memory 518 and/or non-volatile memory 520.

The processing device 500 may also comprise an interface circuit 524, which is in communication with the processor 512, such as via the bus 522. The interface circuit 524 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 524 may comprise a graphics driver card. The interface circuit 524 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 500 may be in communication with various sensors, video cameras, actuators, processing devices, equipment controllers, and other devices of the well construction system via the interface circuit 524. The interface circuit 524 can facilitate communications between the processing device 500 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 526 may also be connected to the interface circuit 524. The input devices 526 may permit a human user to enter the program code instructions 532, which may be or comprise control data, operational parameters, operational set-points, a well construction plan, and/or a database of operational sequences. The program code instructions 532 may further comprise modeling or predictive routines, equations, algorithms, processes, applications, and/or other programs operable to perform example methods and/or operations described herein. The input devices 526 may be, comprise, or be implemented by a keyboard, a mouse, a joystick, a touchscreen, a track-pad, a trackball, an isopoint, and/or a voice recognition system, among other examples. One or more output devices 528 may also be connected to the interface circuit 524. The output devices 528 may permit for visualization or other sensory perception of various data, such as sensor data, status data, and/or other example data. The output devices 528 may be, comprise, or be implemented by video output devices (e.g., an LCD, an LED display, a CRT display, a touchscreen, etc.), printers, and/or speakers, among other examples. The one or more input devices 526 and the one or more output devices 528 connected to the interface circuit 524 may, at least in part, facilitate the communication devices described herein.

The processing device 500 may comprise a mass storage device 530 for storing data and program code instructions 532. The mass storage device 530 may be connected to the processor 512, such as via the bus 522. The mass storage device 530 may be or comprise a tangible, non-transitory storage medium, such as a floppy disk drive, a hard disk drive, a compact disk (CD) drive, and/or digital versatile disk (DVD) drive, among other examples. The processing device 500 may be communicatively connected with an external storage medium 534 via the interface circuit 524. The external storage medium 534 may be or comprise a removable storage medium (e.g., a CD or DVD), such as may be operable to store data and program code instructions 532.

As described above, the program code instructions 532 may be stored in the mass storage device 530, the main memory 516, the local memory 514, and/or the removable storage medium 534. Thus, the processing device 500 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code instructions 532 (i.e., software or firmware) thereon for execution by the processor 512. The program code instructions 532 may include program instructions or computer program code that, when executed by the processor 512, may perform and/or cause performance of example methods, processes, and/or operations described herein.

The present disclosure is further directed to example methods (e.g., operations and/or processes) of performing wellsite operations described herein. The methods may be performed by utilizing or otherwise in conjunction with at least a portion of one or more implementations of one or more instances of the apparatus shown in one or more of FIGS. 1-8, and/or otherwise within the scope of the present disclosure. The methods may be caused to be performed, at least partially, by a processing device, such as the processing device 500 executing program code instructions according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be caused to be performed, at least partially, by a human operator (e.g., rig personnel, maintenance personnel, etc.) utilizing one or more instances of the apparatus shown in one or more of FIGS. 1-8, and/or otherwise within the scope of the present disclosure. Thus, the following description of example methods refer to apparatus shown in one or more of FIGS. 1-8. However, the methods may also be performed in conjunction with implementations of apparatus other than those depicted in FIGS. 1-8 that are also within the scope of the present disclosure.

An example method according to one or more aspects of the present disclosure may comprise commencing operation of a monitoring system 200 for monitoring operational health of an equipment unit. Commencing operation of the monitoring system 200 may cause the monitoring system 200 to receive operational measurements indicative of operational status of the equipment unit from a plurality of sensors 231-238 and determine a plurality of operational health indicators 310, 312, 314, 316, 318 based at least partially on the operational measurements. Each operational health indicator may be indicative of operational health of the equipment unit with respect to a different operational health category 320, 322, 324, 326, 328. The monitoring system 200 may then output the operational health indicators 310, 312, 314, 316, 318 for display on a video output device 196.

Each operational health indicator 310, 312, 314, 316, 318 may be or comprise a number indicative of operational health of the equipment unit. Each operational health indicator 310, 312, 314, 316, 318 may also or instead be or comprise a color indicative of operational health of the equipment unit. The equipment unit may be or comprises a piece of well construction equipment of a well construction system 100 operable to construct a well 102 at a wellsite 104. The equipment unit may be or comprises, for example, the top drive 116, the mud pump unit 144, the drawworks 118, the automated tongs 165, the THM 160, the catwalk 161, the PS system 178 (e.g., a generator unit), the power unit 137, or the shale shaker 172.

The operational health indicator 310 may be indicative of a fraction of an operational capacity of the equipment unit at which the equipment unit is operating. The operational health indicator 312 may be indicative of states of abnormal operation alarms associated with the equipment unit. The operational health indicator 314 may be indicative of states of operational triggers associated with the equipment unit. Each operational trigger may be indicative of a threshold of the operational measurements within a normal operating range of the equipment unit, and each threshold of the operational measurements may be selected based on experience of maintenance personnel with the equipment unit and/or historical operational measurements indicative of operational status of the equipment unit. The operational health indicator 316 may be indicative of amount of deviation of the operational measurements facilitated by the sensors from expected operational measurements determined based on a mathematical model of the equipment unit. The operational health indicator 318 may be indicative of completion status of maintenance work orders for the equipment unit.

In view of the entirety of the present disclosure, including the figures and the claims, a person having ordinary skill in the art will readily recognize that the present disclosure introduces an apparatus comprising a system for monitoring operational health of an equipment unit, wherein the system comprises: a plurality of sensors operable to facilitate operational measurements indicative of operational status of the equipment unit; a video output device; and a processing device comprising a processor and a memory storing an executable program code. The processing device is communicatively connected with the sensors and the video output device and is operable to: receive the operational measurements; determine a plurality of operational health indicators based at least partially on the operational measurements, wherein each operational health indicator is indicative of operational health of the equipment unit with respect to a different operational health category; and output the operational health indicators for display on the video output device.

Each operational health indicator may be or comprise a number indicative of the operational health of the equipment unit.

Each operational health indicator may be or comprise a color indicative of operational health of the equipment unit.

One of the operational health indicators may be indicative of a fraction of an operational capacity of the equipment unit at which the equipment unit is operating.

One of the operational health indicators may be indicative of states of abnormal operation alarms associated with the equipment unit.

One of the operational health indicators may be indicative of states of operational triggers associated with the equipment unit. In such implementations, among others within the scope of the present disclosure, each operational trigger may be indicative of a threshold of the operational measurements within a normal operating range of the equipment unit, and each threshold of the operational measurements may be selected based on: experience of maintenance personnel with the equipment unit; and/or historical operational measurements indicative of operational status of the equipment unit.

One of the operational health indicators may be indicative of an amount of deviation of the operational measurements facilitated by the sensors from expected operational measurements determined based on a mathematical model of the equipment unit.

One of the operational health indicators may be indicative of completion status of maintenance work orders for the equipment unit.

The equipment unit may be or comprise a top drive, a mud pump, or a drawworks of a well construction system operable to construct a well at a wellsite.

The present disclosure also introduces an apparatus comprising a system for monitoring operational health of an equipment unit, wherein the system comprises: a plurality of sensors operable to facilitate operational measurements indicative of operational status of the equipment unit; a video output device; and a processing device comprising a processor and a memory storing an executable program code. The processing device is communicatively connected with the sensors and the video output device and is operable to: receive the operational measurements; determine a plurality of operational health indicators based at least partially on the operational measurements, wherein a first one of the operational health indicators is indicative of a fraction of an operational capacity of the equipment unit at which the equipment unit is operating, wherein a second one of the operational health indicators is indicative of states of abnormal operation alarms associated with the equipment unit, and wherein a third one of the operational health indicators is indicative of completion status of maintenance work orders for the equipment unit; and output the operational health indicators for display on the video output device.

Each operational health indicator may be or comprise a number indicative of the operational health of the equipment unit.

Each operational health indicator may be or comprise a color indicative of operational health of the equipment unit.

A fourth one of the operational health indicators may be indicative of states of operational triggers associated with the equipment unit, wherein each operational trigger may be indicative of a threshold of the operational measurements within a normal operating range of the equipment unit, and wherein each threshold of the operational measurements may be selected based on: experience of maintenance personnel with the equipment unit; and/or historical operational measurements indicative of operational status of the equipment unit.

Another one of the operational health indicators may be indicative of an amount of deviation of the operational measurements facilitated by the sensors from expected operational measurements determined based on a mathematical model of the equipment unit.

The present disclosure also introduces a method comprising commencing operation of a monitoring system for monitoring operational health of an equipment unit, wherein commencing operation of the monitoring system causes the monitoring system to: receive operational measurements indicative of operational status of the equipment unit from a plurality of sensors; determine a plurality of operational health indicators based at least partially on the operational measurements, wherein each operational health indicator is indicative of operational health of the equipment unit with respect to a different operational health category; and output the operational health indicators for display on a video output device.

Each operational health indicator may be or comprise a number indicative of the operational health of the equipment unit.

One of the operational health indicators may be indicative of a fraction of an operational capacity of the equipment unit at which the equipment unit is operating.

One of the operational health indicators may be indicative of states of abnormal operation alarms associated with the equipment unit.

One of the operational health indicators may be indicative of completion status of maintenance work orders for the equipment unit.

The equipment unit may be or comprise a top drive, a mud pump, or a drawworks of a well construction system operable to construct a well at a wellsite.

The foregoing outlines features of several implementations so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such constructions do not depart from the scope of the present disclosure, and that they may make various changes, substitutions, and alterations herein without departing from the scope of the present disclosure.

What is claimed is:

1. An apparatus comprising:
 a system for monitoring operational health of an equipment unit in an assembly of equipment units operatively coupled to one or more controllers, wherein the system comprises:
 a plurality of sensors operable to facilitate operational measurements indicative of operational status of the equipment unit;
 a video output device; and
 a processing device comprising a processor and a memory storing an executable program code, wherein the processing device is communicatively connected with the sensors and the video output device, and wherein the processing device is operable to:
  receive the operational measurements;
  receive one or more operational triggers associated with the equipment unit, wherein each of the one or more operational triggers comprises a threshold operational value within an operating range of the equipment unit and wherein each threshold operational value within the operating range is selected based on historical operational measurements indicative of the operational status of the equipment unit;
  determine a plurality of independent operational health indicators based on the operational measurements exceeding at least one of the threshold operational values of the one or more operational triggers, wherein each of the independent operational health indicators is indicative of the operational health of the equipment unit with respect to a different operational health category;
  determine a cumulative operational health indicator based on the plurality of independent operational health indicators; and
  simultaneously display the plurality of independent operational health indicators based on at least one of the operational measurements exceeding at least one of the threshold operational values of the one or more operational triggers and the cumulative operational health indicator for the equipment unit on the video output device.

2. The apparatus of claim 1 wherein each of the independent operational health indicators and the cumulative operational health indicator is or comprises a number indicative of the operational health of the equipment unit.

3. The apparatus of claim 1 wherein each of the independent operational health indicators and the cumulative operational health indicator is or comprises a color indicative of operational health of the equipment unit.

4. The apparatus of claim 1 wherein one of the independent operational health indicators is indicative of a fraction of an operational capacity of the equipment unit at which the equipment unit is operating.

5. The apparatus of claim 1 wherein one of the independent operational health indicators is indicative of states of operation alarms associated with the equipment unit.

6. The apparatus of claim 1 wherein one of the independent operational health indicators is indicative of an amount of deviation of the operational measurements facilitated by the sensors from expected operational measurements determined based on a mathematical model of the equipment unit.

7. The apparatus of claim 1 wherein one of the independent operational health indicators is indicative of completion status of maintenance work orders for the equipment unit.

8. The apparatus of claim 1 wherein the equipment unit is or comprises a top drive, a mud pump, or a drawworks of a well construction system operable to construct a well at a wellsite.

9. The apparatus of claim 1, wherein the cumulative operational health indicator is centered with respect to the independent operational health indicators.

10. The apparatus of claim 1, wherein the cumulative operational health indicator comprises a sum or an average of the independent operational health indicators.

11. An apparatus comprising:
 a system for monitoring operational health of an equipment unit in an assembly of equipment units operatively coupled to one or more controllers, wherein the system comprises:
 a plurality of sensors operable to facilitate operational measurements indicative of operational status of the equipment unit;
 a video output device; and
 a processing device comprising a processor and a memory storing an executable program code, wherein the processing device is communicatively connected with the sensors and the video output device, and wherein the processing device is operable to:
  receive the operational measurements;
  receive a first operating threshold value associated with the equipment unit, wherein the first operating threshold value is selected based on historical operational measurements indicative of the operational status of the equipment unit;
  receive a second operating threshold associated with the equipment unit, wherein the second operating threshold is selected based on a manufacturer recommended maximum value and wherein the second operating threshold is greater than the first operating threshold;
  determine a plurality of independent operational health indicators based on the operational measurements or a work order status, wherein a first of the plurality of operational health indicators is indicative of a fraction of an operational capacity of the equipment unit at which the equipment unit is operating, wherein a second of the plurality of operational health indicators is indicative of states of operation alarms associated with the equipment unit, wherein the operation alarms are indicative of the operational measurements being between the first operating threshold and the second operating threshold, and wherein a third of the plurality of operational health indicators is indicative of a percent of maintenance work orders completed for the equipment unit; and
  determine a cumulative operational health indicator based on the plurality of independent operational health indicators; and
  simultaneously output the independent operational health indicators and the cumulative operational health indicator for the equipment unit for display on the video output device.

12. The apparatus of claim 11 wherein at least one of the independent operational health indicators and the cumulative operational health indicator is or comprises a number indicative of the operational health of the equipment unit.

13. The apparatus of claim 11 wherein at least one of the independent operational health indicators and the cumulative operational health indicator is or comprises a color indicative of operational health of the equipment unit.

14. The apparatus of claim 11 wherein a fourth of the plurality of independent operational health indicators is indicative of states of operational triggers associated with the equipment unit, wherein each operational trigger comprises a threshold of the operational measurements within an operating range of the equipment unit, and wherein each threshold of the operational measurements is selected based on historical operational measurements indicative of operational status of the equipment unit.

15. The apparatus of claim 11 wherein a fourth of the plurality of independent operational health indicators is indicative of an amount of deviation of the operational measurements facilitated by the sensors from expected operational measurements determined based on a mathematical model of the equipment unit.

16. A method comprising:
commencing operation of a monitoring system for monitoring operational health of an equipment unit in an assembly of equipment units operatively coupled to one or more controllers, wherein commencing operation of the monitoring system causes the monitoring system to:
receive operational measurements indicative of operational status of the equipment unit from a plurality of sensors;
receive a maximum operational capacity of the equipment unit, wherein the maximum operational capacity comprises a first threshold operational value;
receive a rated operational capacity of the equipment unit, wherein the rated operational capacity comprises a second threshold operational value and wherein the first threshold operational value is greater than the second threshold operational value;
determine a plurality of independent operational health indicators based on the operational measurements, wherein each of the plurality of independent operational health indicators is indicative of the operational health of the equipment unit with respect to a different operational health category, wherein one of the independent operational health indicators is indicative of the equipment unit being in one of a plurality of conditions, including a first condition in which the operational measurements exceed the second threshold operational value, but not the first threshold operational value, and a second condition in which the operational measurements exceed both the first threshold operational value and the second threshold operational value;
determine a cumulative operational health indicator based on the plurality of independent operational health indicators; and
simultaneously display the independent operational health indicators and the cumulative operational health indicator for the equipment unit on the video output device.

17. The method of claim 16 wherein each of the independent operational health indicators and the cumulative operational health indicator is or comprises a number and/or a color indicative of the operational health of the equipment unit.

18. The method of claim 16 wherein one of the plurality of independent operational health indicators is indicative of states of operation alarms associated with the equipment unit.

19. The method of claim 16 wherein one of the plurality of independent operational health indicators is indicative of completion status of maintenance work orders for the equipment unit.

20. The method of claim 16 wherein the equipment unit is or comprises a top drive, a mud pump, or a drawworks of a well construction system operable to construct a well at a wellsite.

* * * * *